United States Patent [19]
Halasa et al.

[11] Patent Number: 4,845,165
[45] Date of Patent: Jul. 4, 1989

[54] ANIONIC DIENE POLYMERIZATION PROCESS WITH BRANCHING

[75] Inventors: Adel F. Halasa, Bath; Sylvia E. Robertson-Wilcox, Akron; David J. Zanzig, Uniontown; Richard J. Arconti, Akron; Wen L. Hsu, Copley, all of Ohio

[73] Assignee: The Goodyear Tire & Rubber Company, Akron, Ohio

[21] Appl. No.: 25,533

[22] Filed: Mar. 13, 1987

[51] Int. Cl.$^4$ .............................. C08F 2/00; C08F 8/42
[52] U.S. Cl. .................................... 526/78; 525/236; 525/237; 525/332.3; 525/342; 525/364; 526/82; 526/86
[58] Field of Search .............. 525/342, 271, 236, 366, 525/237, 364, 370, 332.3, 248, 250; 526/82, 78, 86

[56] References Cited

U.S. PATENT DOCUMENTS

| | | | |
|---|---|---|---|
| 3,280,084 | 10/1966 | Zelinski et al. | 525/271 |
| 3,536,691 | 10/1970 | Trepka et al. | 526/86 |
| 3,592,799 | 7/1971 | Rouzier | 526/79 |
| 3,639,521 | 2/1972 | Hsieh | 525/314 |
| 3,651,025 | 3/1972 | Bean et al. | 525/366 |
| 3,737,421 | 6/1973 | Halasa | 526/82 |
| 4,482,678 | 11/1984 | Furukawa et al. | 525/342 |

Primary Examiner—Wilbert J. Briggs, Sr.
Attorney, Agent, or Firm—Alvin T. Rockhill

[57] ABSTRACT

Metals from Groups I and II and organometallic compounds thereof can be used to catalyze the polymerization of diene monomers into polymers. The polymers formed in such polymerizations are terminated with the metal used to catalyze the polymerization and are sometimes referred to as living polymers. Very useful blends of such polymers can be made by utilizing the process of the present invention. More specifically, the present invention discloses a process for preparing a polydiene rubber blend comprising: (1) polymerizing at least one diene monomer utilizing at least one catalyst selected from the group consisting of Group I metals, Group II metals, organometallic compounds containing a Group I metal, and organometallic compounds containing a Group II metal, to a conversion which is within the range of 30% to 70% to produce low molecular weight polydiene chains; (2) joining from 20% to 70% of said low molecular weight polydiene chains with a suitable branching agent; and (3) allowing the polymerization to continue so as to produce said polydiene rubber blends.

18 Claims, No Drawings

ANIONIC DIENE POLYMERIZATION PROCESS WITH BRANCHING

BACKGROUND OF THE INVENTION

Metals from Groups I and II and organometallic compounds thereof are commonly used to catalyze the polymerization of monomers into polymers. For example, lithium, barium, magnesium, sodium, and potassium are metals that are frequently utilized in such polymerizations. Organolithium compounds are widely used to initiate such polymerizations. Catalyst systems of this type are of commercial importance because they can be used to produce stereoregulated polymers. For instance, lithium catalysts can be utilized to catalyze the anionic polymerization of isoprene into cis-1,4-polyisoprene.

The polymers formed in such polymerizations are terminated with the metal used to catalyze the polymerization and are sometimes referred to as living polymers. They are referred to as living polymers because the polymer chains which are terminated with the metal catalyst continue to grow or live until all of the available monomer is exhausted. Polymers that are prepared by utilizing such metal catalysts have structures which are essentially linear. Such polymers have structures that do not contain appreciable amounts of branching. Rubbery polymers of this type have certain drawbacks in that their flow characteristics at room temperature are extremely high and in that their tensile strength and tear resistance in the unvulcanized state are very poor due to less chain entanglement among their molecular chains. Due to these characteristics, the processing of such rubbery polymers prior to vulcanization is sometimes difficult. In order to improve the cold flow characteristics, tensile strength, and tear resistance of such unvulcanized rubbers they are often crosslinked prior to processing and subsequent vulcanization. Such metal terminated rubbery polymers can, for example, be crosslinked by treatment with divinylbenzene or tin halides. The use of such chemical agents in effect endlinks the polymer chains.

It is also known in the art that metal terminated polymers can be endlinked by treating them with a stoichiometric amount of silicon tetrachloride. The endlinking of a lithium terminated polymer with silicon tetrachloride is illustrated in the following reaction scheme:

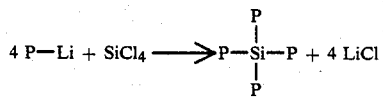

wherein P represents polymer chains. As can be seen, one mole of silicon tetrachloride is required for every four moles of lithium terminated polymer chains. In other words, one mole of silicon tetrachloride is required for every four moles of lithium in the lithium terminated polymer being treated. This relationship must be stoichiometrically perfect in order to endlink every lithium terminated polymer chain in the polymer being treated.

The endlinking of metal terminated polymers improves numerous physical properties. However, conventional endlinked polymers typically have very high molecular weights which makes processing difficult. This is because the high molecular weight polymers formed which have long chain branches tend to be broken down during milling and/or mixing operations. This results in the polymer's molecular weight being reduced during such operations which apply shearing forces. The polymers utilized in such operations typically have higher molecular weights than the ultimate molecular weight desired in anticipation of the molecular weight loss which occurs during processing. Even though it is possible to compensate for molecular weight loss, the polymer degradation which occurs still has a very detrimental effect on the physical properties of the polymer.

SUMMARY OF THE INVENTION

This invention discloses a technique for preparing polymer blends which can be processed without a significant amount of polymer degradation occurring. These polymers have particularly good utility for utilization in tires and other rubber articles. Rubbers made utilizing the technique of this invention have particular value for use in tire treads because they result in tires which have reduced rolling resistance as well as good traction and tear wear characteristics.

The present invention more specifically reveals a process for preparing a polyidiene rubber blend comprising: (1) polymerizing at least one diene monomer utilizing at least one catalyst selected from the group consisting of Group I metals, Group II metals, organometallic compounds containing a Group I metal, and organometallic compounds containing a Group II metal, to a conversion which is within the range of 30% to 70% to produce low molecular weight polydiene chains: (2) joining from 20% to 70% of said low molecular weight polydiene chains with a suitable branching agent; and (3) allowing the polymerization to continue so as to produce said polydiene rubber blends.

DETAILED DESCRIPTION OF THE INVENTION

In the first step of the process of this invention, low molecular weight polyidiene chains are prepared. These low molecular weight polyidiene chains are terminated with the metal utilized in initiating the polymerization. For instance if an organolithium catalyst is utilized, the polymer chains will be terminated with lithium. However, the polymer chains can be terminated with any metal from Group I or Group II of the Periodic Table which is utilized in initiating the polymerization.

The diene monomers (diolefin monomers) utilized in the preparation of such low molecular weight polydiene chains normally contain from 4 to 12 carbon atoms with those containing from 4 to 8 carbon atoms being more commonly utilized. The diolefin monomers used in such low molecular weight polydiene chains are normally conjugated diolefins.

The conjugated diolefin monomers which are utilized in the synthesis of such low molecular weight chains generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 1,3-pentadiene, 2-methyl-1,3-pentadiene, 4-butyl-1,3-pentadiene, 1,3-hexadiene, 1,3-octadiene, 2,3-dimethyl-1,3-butadiene, piperylene, 2,3-dibutyl-1,3-pentadiene, 2-ethyl-1,3-pentadiene, 2-ethyl-1,3-butadiene, 3-butyl-1,3-octadiene, 2-phenyl-1,3-butadiene, and the like, alone or in admixture.

Feed stocks which are comprised of one or more conjugated diolefin monomers in admixture with other low molecular weight hydrocarbons can be utilized in the synthesis of the low molecular weight polydiene chains and subsequently in the synthesis of the high molecular weight polydiene polymer. Such admixtures, termed low concentration diene streams, are obtainable from a variety of refinery product streams, such as naptha-cracking operations or can be intentionally blended compositions. Some typical examples of low molecular weight hydrocarbons which can be admixed with diolefin monomers, such as 1,3-butadiene, in the polymerization feed include propane, propylene, isobutane, n-butane, 1-butene, isobutylene, trans-2-butene, cis-2-butene, vinylacetylene, cyclohexane, ethylene, propylene, and the like.

Low molecular weight polydiene chains which are comprised of two or more diolefin monomers can also be prepared in the first step of the process of the present invention. For instance, low molecular weight polydiene chains of isoprene and butadiene can be synthesized and subsequently utilized in the preparation of the blends of this invention.

Polydiene rubbers which are copolymers or terpolymers of diolefin monomers with one or more other ethylenically unsaturated monomers can also be prepared utilizing the process of this invention. Some representative examples of ethylenically unsaturated monomers that can potentially be synthesized into such polymers include alkyl acrylates, such as methyl acrylate, ethyl acrylate, butyl acrylate, methyl methacrylate and the like; vinylidene monomers having one or more terminal $CH_2$—CH-groups; vinyl aromatics such as styrene, $\alpha$-methylstyrene, bromostyrene, chlorostyrene, fluorostyrene and the like; $\alpha$-olefins such as ethylene, propylene, 1-butene, and the like; vinyl halides, such as vinylbromide, chloroethane (vinylchloride), vinylfluoride, vinyliodide, 1,2-dibromethene, 1,1-dichloroethane (vinylidene chloride), 1,2-dichloroethane, and the like; vinyl esters, such as vinyl acetate; $\alpha,\beta$-olefinically unsaturated nitriles, such as acrylonitrile and methacrylonitrile; $\alpha,\beta$-olefinically unsaturated amides, such as acrylamide, N-methyl acrylamide, N,N-dimethylacrylamide, methacrylamide and the like.

Polydiene rubbers which are copolymers of one or more diene monomers with one or more other ethylenically unsaturated monomers will normally contain from about 50 weight percent to about 99 weight percent diene monomers and from about 1 weight percent to about 50 weight percent of the other ethylenically unsaturated monomers in addition to the diene monomers. For example, copolymers of diene monomers with vinylaromatic monomers, such as styrene-butadiene rubber (SBR) which contain from 50 to 95 weight percent diene monomers and from 5 to 50 weight percent vinylaromatic monomers are useful in many applications.

Vinyl aromatic monomers are probably the most important group of ethylenically unsaturated monomers which are commonly incorporated into polydiene rubber. Such vinyl aromatic monomers are, of course, selected so as to be copolymerizable with the diolefin monomers being utilized. Generally, any vinyl aromatic monomer which is known to polymerize with organometallic initiators can be used. Such vinyl aromatic monomers typically contain from 8 to 20 carbon atoms.

Usually the vinyl aromatic monomer will contain from 8 to 14 carbon atoms. The most widely used vinyl aromatic monomer is styrene. Some examples of vinyl aromatic monomers that can be utilized include 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and the like.

The relative amount of conjugated diene or dienes and monovinyl aromatic compound or compounds employed can vary over a wide range. In preparing rubbery polymers, the proportion of the conjugated diene versus the monovinyl-substituted aromatic compound should be sufficient so as to result in a substantially rubbery or elastomeric copolymer product. There is no sharp break point as to the amount of conjugated diene versus monovinyl-substituted aromatic compound that confers rubbery or elastomeric properties on the resulting copolymer, though in general at least 50 parts by weight of conjugated diene are required on an exemplary basis. Thus, for a rubbery copolymer, as is preferred in accordance with this invention, the weight ratio of conjugated diene to monovinyl aromatic compound in the monomer charge would be in the range of about 50:50 to 95:5. Of course, mixtures of conjugated dienes as well as mixtures of monovinyl-substituted aromatic compounds can be utilized.

The polymerizations of the present invention will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture. The process of this invention is also useful in bulk polymerizations which are initiated with organometallic catalyst systems that result in the formation of metal terminated living polymer chains.

In solution polymerizations which utilize the process of this invention, there will normally be from 5 to 35 weight percent monomers in the polymerization medium. Such polymerization mediums are, of course, comprised of an organic solvent, monomers, and at least one initiator selected from the group consisting of Group I metals, Group II metals, organometallic compounds containing a Group I metal, and organometallic compounds containing a Group II metal. In most cases it will be preferred for the polymerization medium to contain from 10 to 30 weight percent monomers. It is generally more preferred for the polymerization medium to contain 20 to 25 weight percent monomers.

The organometallic initiators employed in the process of this invention include the monofunctional and multifunctional types known for polymerizing the monomers described herein. The multifunctional organometallic initiators can be either specific organometallic compounds or can be multifunctional types which are not necessarily specific compounds but rather represent reproducible compositions of regulated functionality. However, it will generally be preferred to utilize a monofunctional organometallic initiator.

The amount of organometallic initiator utilized will vary with the monomers being polymerized and with the molecular weight that is desired for the polymer being synthesized. However, as a general rule from 0.1 to 1 phm (parts per 100 parts by weight of monomer) of an organometallic initiator will be utilized. In most cases, from 0.01 to 0.1 phm of an organometallic initiator will be utilized with it being preferred to utilize 0.025 to 0.07 phm of the organometallic initiator.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a sec- or tert-organomonolithium compound with 1,3-butadiene, on a ratio of such as about 2 to 4 moles of organomonolithium compound per mole of 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by $R(Li)_x$ wherein R represents a hydrocarbyl radical of such as 1 to 20 carbon atoms per R group, and x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The preferred initiators for utilization in the process of this invention are organo monolithium compounds. Alkyllithium compounds are highly preferred. Some representative examples of such alkyllithium compounds include: ethyllithium, isopropyllithium, n-propyllithium, n-butyllithium, secondary-butyllithium, tertiary-butyllithium, normal-hexyllithium, and tertiary-octyllithium.

The polymerization temperature utilized can vary over a broad range of from about −20° C. to about 150° C. In most cases a temperature within the range of about 30° C. to about 125° C. will be utilized. The pressure used will normally be sufficient to maintain a substantially liquid phase under the conditions of the polymerization reaction.

The polymerization is conducted for a length of time sufficient to attain a conversion which is within the range of 30% to 70% in the first step of the process of this invention. In other words, the polymerization is normally carried out until from 30% to 70% of the monomers present have been polymerized. It is normally preferred for a conversion which is within the range of 40% to 60% to be attained in the first step. Conversions which are in the range of 45% to 55% are generally more preferred. This results in the formation of low molecular weight polydiene chains with substantially amounts of residual unreacted monomer still being present. The low molecular weight polydiene chains produced will normally have a number average molecular weight which is within the range of about 30,000 to about 150,000. It is generally preferred for the low molecular weight polydiene chains produced to have a number average molecular weight which is within the range of 75,000 to 100,000.

The second step of the process of this invention involves joining the low molecular weight polydiene chain produced with a suitable joining agent. This step will normally involve the addition of a suitable joining agent to the polymerization medium which is comprised of the low molecular weight polydiene chain and monomer. In the case of solution polymerization, the polymerization medium will, of course, also contain an organic solvent. A wide variety of compounds are suitable for the purpose of joining the low molecular weight polydiene chain. Such joining agents are normally multifunctional compounds which are capable of reacting with at least 2 and preferably 3 or more low molecular weight polydiene chains. In most cases it will be highly preferred for the multifunctional joining agent to be capable of joining at least 4 low molecular weight polydiene chains. Normally, the multifunctional joinint agent reacts with the metal which terminates the low molecular weight polydiene chains. Some representative examples of suitable joining agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, we prefer those which are liquid since they are more readily handled and form a relatively small nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-ariridinyl)phosphine oxide, tri(2-methyl-1-ariridinyl)phosphine oxide, tri(2-ethyl-3-decyl-1-ariridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde containing aliphatic and aromatic compounds. The multiketones can be represented by compounds such as 1,4,9,10-anthraceneterone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-tricarbethoxybenzene, and the like.

The preferred multihalides are silicon tetrahalides, such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,4,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon multihalides as described hereinabove, other metal multihalides, particularly those of tin, lead, or germanium, also can be readily employed as coupling and branching agents. The most preferred joining agents include tin chloride, hexachlorodisilane, dimethyl tin dichloride, methyl trichlorosilane, silicon tetrachloride, carbon tetrachloride and dichlorodimethylsilane.

A sufficient amount of the coupling agent will be utilized so as to join from 20% to 70% of the low molecular weight polydiene chains. It is normally preferred to joint from 40% to 60% of the low molecular weight polydiene chains and more preferred to join from 45% to 55% of the low molecular weight polydiene chains. The number of low molecular weight polydiene chains present can be calculated on the basis of the amount and type of initiator employed. This is because generally 1 mole of polydiene chain will be produced per mole of metal atom in the initiator used. For example, normally about 1 mole of polydiene chain will be produced per mole of organo monolithium initiator utilized in the polymerization. The amount of joining agent needed to join from 20% to 70% of the low molecular weight polydiene chain present will, of course, be dependent upon the number of functional groups in the joining agent. For instance, 1 mole of silicon tetrachloride is capable of joining 25% of the polymer chains in a medium containing 8 moles of low molecular weight polymer chains. Two moles of silicon tetrachloride are accordingly capable of joining 50% of the low molecular weight polydiene chains in such a medium. The exact amount of joining agent required in order to join from 20% to 70% of the low molecular weight polydiene chains in a given medium can be easily ascertained by persons having ordinary skill in the art. This joining will normally be done by adding the joining agent to the polymerization zone in which the monomers are being polymerized into polymers.

The joining of the low molecular polydiene chains results in the formation of a composition which is comprised of a branched polymer and residual low molecular weight polydiene chains. During the third stage of the process of this invention, the residual low molecular weight polydiene chains are allowed to continue to polymerize into high molecular weight polydiene polymers. Normally, the polymerization will be continued for a length of time sufficient to permit substantially complete polymerization of the residual monomers. In other words, the polymerization is normally carried out until high conversions are attained. The polymerization can then be terminated using a standard technique. For instance, the polymerization can be terminated with a conventional noncoupling type of terminator, such as water, an acid, an alcohol or the like.

The polymerization carried out during the third stage of the process of this invention will normally be done at the temperature at which the polymerization in the first stage of the process of this invention was conducted. However, the temperature can be adjusted to higher or lower temperatures in order to change the microstructure of the polymer being formed as desired. Likewise, a polar modifier can be added at any stage of the polymerization. It is often desirable to add a modifier shortly after the low molecular weight polydiene chains are joined. By changing the polymerization temperature and by modifier addition, polymers having multiple glass transition temperatures can be prepared. Such polymer modifiers increase the content of 1,2-linkages (vinyl groups) present in the polymer being synthesized. Some representative examples of modifiers that can be used include: dipiperidinoethane, dipyrrolidinoethane, tetramethylethylene diamine, diethylene glycol dimethyl ether, tetrahydrofuran, 1,2-dimethoxybenzene, 1,2,3-trimethoxybenzene, 1,2,4-trimethoxybenzene, 1,2,3-triethoxybenzene, 1,2,3-tributoxybenzene, and 1,2,4-triethoxybenzene. The amount of modifier needed will vary greatly with the vinyl content which is desired for the polymer being synthesized. For instance, polymers with only slightly increased vinyl contents can be prepared by utilizing as little as 0.1 mole of the modifier per mole of lithium in the lithium initiator. If polymers having very high vinyl contents are desired, then larger quantities of the modifier will be employed. However, normally there will be no reason to employ more than about 40 moles of the modifier per mole of lithium in the lithium initiator system employed. In most cases from about 0.25 moles to about 15 moles of the modifier will be employed per mole of lithium in the lithium initiator system. More typically, from about 0.5 moles to 10 moles of the modifier will be utilized per mole of lithium in the lithium initiator.

The third stage of the process of this invention results in the formation of a polydiene rubber blend which is comprised of a branched polymer and a high molecular weight polydiene polymer. The branched polymer in the blend is formed through the branching reaction and the high molecular weight polydiene polymer is formed by continuing to polymerize the low molecular weight polydiene chains. The high molecular weight polydiene polymers in the blend can optionally be coupled utilizing conventional coupling agents. However, it will generally not be necessary or desirable to couple the high molecular weight polydiene polymers.

Polymers which are made by utilizing the solution polymerization techniques of this invention can be recovered utilizing conventional techniques. In many cases it will be desirable to destroy residual carbon-metal bonds which may be present in the polymer solution and to recover the synthetic polymer blend produced. It may also be desirable to add additional antioxidants to the polymer solution in order to further protect the polydiene blend produced from potentially deleterious effects of contact with oxygen. The polymer blend made can be precipitated from the polymer solution and any remaining metal moieties can be inactivated by the addition of lower alcohols, such as isopropyl alcohol, to the polymer solution. The polydiene can be recovered from the solvent and residue by means such as decantation, filtration, centrification, and the like. Steam stripping can also be utilized in order to remove voltage organic compounds.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLES 1-5

In this series of experiments, polymer premixes containing approximately 18% total monomers were passed through a sodium hydroxide, 3 A molecular sieve and silica gel column. The various monomer solutions were then introduced into a 5 gallon (18.9 liter) reactor which had been conditioned with a normal-butyllithium and hexane rinse. Normal-butyllithium was slowly added to the reactor until a slight foam appeared indicating that the impurities had been scavenged. The polymerization was initiated by adding an appropriate amount of n-butyllithium. Conversions of monomer to polymer were monitored during the polymerization by testing solid contents which was confirmed by GPC analysis of the soluble fraction in ethanol. At various conversions of monomer to polymer ranging from 30 to 100%, various levels of joining agents were added in order to join half of the living, low molecular weight polydiene chains in the solution. The polymerization was then continued to 100% conversion and was then short stopped with methanol. An antioxidant was then added and the polymer blends produced were recovered and vacuum dried. In Examples 1-3, polybutadiene blends were prepared. In Example 4 a styrene-butadiene rubber was prepared and in Example 5 an isoprene-butadiene copolymer was made. Tin tetrachloride was used as the joining agent in Examples 1, 2, and 4. Methyl trichlorosilane was used as the joining agent in Example 3 with carbon tetrachloride being utilized as the joining agent in Example 5. The glass transition temperature (Tg), tan delta at 60° C. and at 0° C., the Mooney viscosity, and the calculated number average molecular weight of the low molecular weight polydiene chains in the branched polymer in the blends are reported in Table I.

TABLE I

| Example | Tg(°C.) | Tan Delta 60° C. | Tan Delta 0° C. | Mooney Viscosity | Mn |
|---|---|---|---|---|---|
| 1 | −32 | .088 | .455 |  | 150,000 |
| 2 | −32 | .079 | .490 | 52 | 250,000 |
| 3 | −54 | .086 | .165 | 38 | 250,000 |
| 4 | −46 | .125 | .320 | 42 | 150,000 |

TABLE I-continued

| Example | Tg(°C.) | Tan Delta 60° C. | Tan Delta 0° C. | Mooney Viscosity | Mn |
|---|---|---|---|---|---|
| 5 | −25 | .139 | .570 | 56 | 250,000 |

With respect to tan delta values, the use of polyfunctional joining agents during the polymerization of the polybutadiene polymers showed the best overall properties. Repeatedly good tan delta values were obtained at calculated number average molecular weight values of 75,000 or 250,000 with the joining being done utilizing tin tetrachloride at conversions of 30 and 50%. The polybutadiene blends prepared showed good processability. The low tan delta values attained at 60° C. are indicative of good rolling resistance when incorporated into tire treads. The blends prepared also showed good carbon black dispersion characteristics.

EXAMPLE 6

In this experiment, 1000 g of 1,3-butadiene was polymerized in n-hexane utilizing 0.01 moles of normal-butyllithium as the initiator. At a conversion of 30% tetramethylethylene diamine was added as a modifier. The molar ratio of tetramethylethylene diamine to the initiator was 4:1. After 5 minutes, 0.00125 moles tin tetrachloride was added to couple half of the low molecular weight polydiene chains present. The low molecular weight polydiene chains had a number average molecular weight of about 30,000 and contained about 55% trans-microstructure, about 35% cis-microstructure, and about 10% 1,2-microstructure. After the modifier was added, the polymer chain segments produced contained about 70% 1,2-microstructure, about 15% cis-microstructure, and about 15% trans-microstructure. The high molecular weight linear polybutadiene produced contained a medium vinyl segment and a high vinyl segment (produced after the modifier was added) and had a number average molecular weight of about 100,000.

The polymer blend made by the polymerization technique in this experiment was comprised of the high molecular weight linear polymer and a branched polymer made by joining four low molecular weight polydiene chains. The branched polymer had 4 arms and had a number average molecular weight of about 120,000. The blend produced was determined to have a glass transition temperature of −72° C., a Mooney ML-4 (100° C.) viscosity of 55, a tan delta at 0° C. of 0.184, and a tan delta at 60° C. of 0.150.

EXAMPLE 7

In this experiment the technique described in Example 6 was repeated except that at a conversion of 30% the tin tetrachloride was added followed by the addition of the modifier about 5 minutes later. The blend produced in this experiment was determined to have a glass transition temperature of −65° C., a Mooney ML-4 viscosity at 100° C. of 80, a tan delta at 0° C. of 0.176 and a tan delta at 60° C. to 0.096.

While certain representative embodiments and details have been shown for the purpose of illustrating the present invention, it will be apparent to those skilled in this art that various changes and modifications can be made therein without departing from the scope of the present invention.

What is claimed is:

1. A process for preparing a polydiene rubber blend consisting of: (1) polymerizing at least one conjugated diene monomer utilizing at least one organolithium catalyst which is represented by the formula $R(Li)_x$ wherein R represents a hydrocarbyl radical containing from 1 to 20 carbon atoms and wherein x is an integer of 1 to 4, to a conversion which is within the range of 30% to 70% to produce low molecular weight polydiene chains; (2) joining from 20% to 70% of said low molecular weight polydiene chains with tin tetrachloride; (3) allowing the polymerization to continue so as to produce said polydiene rubber blends; and (4) recovering the polydiene rubber blend.

2. A process for preparing a polydiene rubber blend consisting of: (1) polymerizing at least one conjugated diene monomer to a conversion which is within the range of 30% to 70% utilizing at least one organolithium initiator which is represented by the formula $R(Li)_x$ wherein R represents a hydrocarbyl radical containing from 1 to 20 carbon atoms and wherein x is an integer of 1 to 4, to produce low molecular weight polydiene chains; (2) joining from 20% to 70% of said low molecular weight polydiene chains with tin tetrachloride to produce a composition which is comprised of a branched polymer and residual low molecular weight polydiene chains; (3) allowing the polymerization to continue so as to increase the molecular weight of the low molecular weight polydiene chains to form said polydiene rubber blend which is comprised of said branched polymer and a high molecular weight polydiene polymer; and (4) recovering the polydiene rubber blend.

3. The polydiene rubber blend made by the process specified in claim 1.

4. The polydiene rubber blend made by the process specified in claim 2.

5. A process as specified in claim 1 wherein the polymerization is conducted under solution polymerization conditions.

6. A process as specified in claim 5 wherein said joining is done after a conversion within the range of 40% to 60% has been attained.

7. A process as specified in claim 6 wherein said polymerization is conducted at a temperature within the range of −20° C. to 150° C.

8. A process as specified in claim 7 wherein from 40 to 60 weight percent of said low molecular weight polydiene chains are joined.

9. A process as specified in claim 8 wherein said polymerization is conducted at a temperature within the range of 30° C. to 125° C. and wherein from 0.01 to 1 phm of said organolithium compound is utilized.

10. A process as specified in claim 9 wherein said diene monomer contains from 4 to 8 carbon atoms.

11. A process as specified in claim 9 wherein said diene monomer is 1,3-butadiene.

12. A process as specified in claim 11 wherein said joining is done after a conversion within the range of 45% to 55%.

13. A process as specified in claim 12 wherein from 45% to 55% of said low molecular weight polydiene chains are joined.

14. A process as specified in claim 13 wherein said organolithium compound is an alkyl lithium compound.

15. A process as specified in claim 14 wherein a modifier is added after the low molecular weight polydiene chains are joined.

16. A rubber blend as specified in claim 4 which is comprised of a branched polymer which is comprised of 50 to 70% butadiene, 30 to 40% isoprene, and 3 to 10% styrene; and a high molecular weight polydiene polymer which is comprised of 30 to 50% butadiene, 30 to 50% isoprene, and 10 to 30% styrene.

17. A polydiene rubber blend as specified in claim 4 which is comprised of a branched polymer which is comprised of about 60% butadiene, about 35% isoprene, and about 5% styrene; and a high molecular weight polydiene polymer which is comprised of about 40% butadiene, 40% isoprene, and 20% styrene.

18. A process as specified in claim 2 wherein the joining agent is tin tetrachloride.

* * * * *